Figures 1, 2:
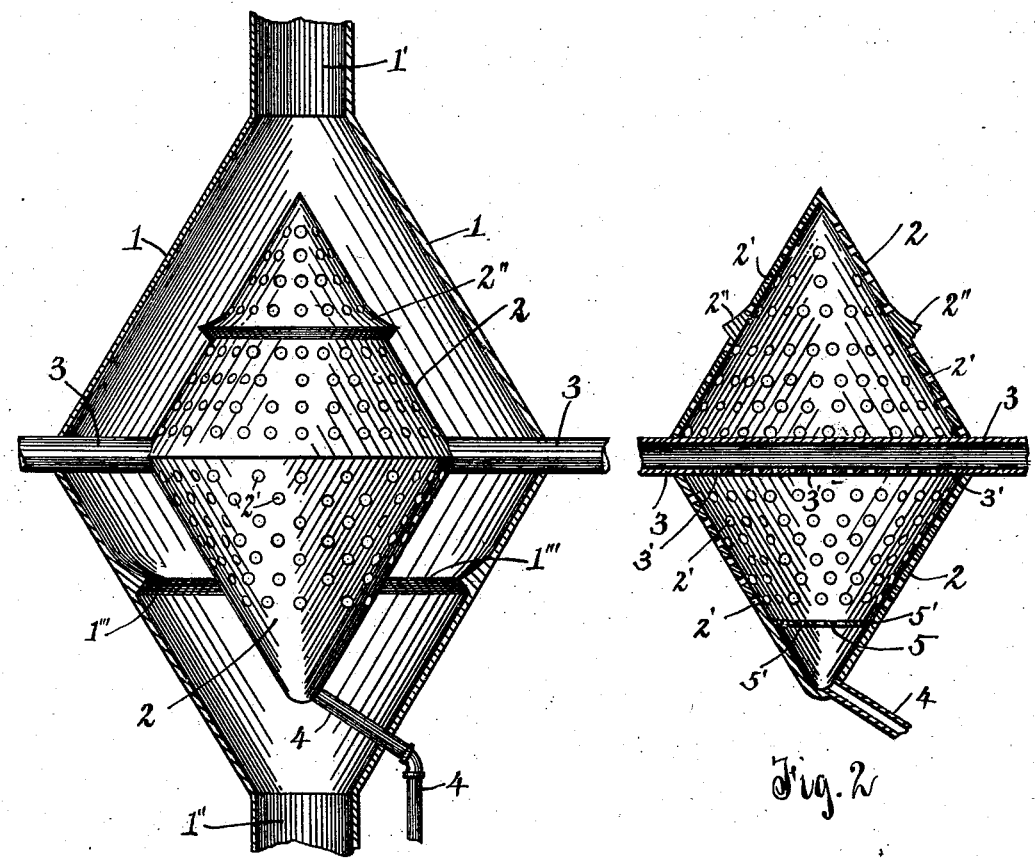

(No Model.)

F. M. CAINE.
WHEAT STEAMER.

No. 534,030. Patented Feb. 12, 1895.

WITNESSES:

Franklin M Caine INVENTOR

BY

ATTORNEY

UNITED STATES PATENT OFFICE.

FRANKLIN M. CAINE, OF CHESANING, MICHIGAN.

WHEAT-STEAMER.

SPECIFICATION forming part of Letters Patent No. 534,030, dated February 12, 1895.

Application filed November 26, 1894. Serial No. 529,918. (No model.)

*To all whom it may concern:*

Be it known that I, FRANKLIN M. CAINE, a citizen of the United States, residing at Chesaning, in the county of Saginaw and State of Michigan, have invented certain new and useful Improvements in Wheat-Steamers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to means for steaming wheat. It is common to heat or steam wheat as it passes to the stone to be ground. Heretofore various means have been provided for heating the wheat and some for steaming it. In the latter, the steam in nearly all instances has been thrown directly upon the wheat without having the moisture of the steam reduced, and being thereby objectionable.

The device hereinafter described uses steam from which the moisture has, to a large extent, been removed, the dripping, if any, not passing through the body of the wheat as is common.

In the drawings, Figure 1 is an elevation of the device showing the shell in section. Fig. 2 is a section of the steam chamber.

1 is the shell of the device and is an enlargement of the pipe carrying the grain to the stone. We have shown it in conical shape but it may be spherical or any other form by which it may be best adapted for use.

1' is the end of the pipe carrying the wheat to the steamer, and 1" leads to the stone.

2 is a double conical device in the center of the shell and is supported therein on the pipe 3 which passes entirely through the shell at or about the middle thereof.

The steamer 2 is free from the inner walls of the shell and is at the proper distance therefrom so as to not prevent the passage of the wheat through the shell.

2" is a collar on the steamer at the proper distance below the apex of the cone and is for the purpose of throwing the berry after it has struck the cone toward the walls of the shell and prevent it sliding down the slope of the cone, as it otherwise would.

2' are perforations in the peripherical surface of the cone and through these perforations the steam passes to mingle with the wheat as it passes through the shell in the channels around the steamer. The steam passing into the pipe 3 is carried into the steamer and passes out of the pipe into the inside of the steamer through the holes 3' on the under side of the pipe. Thus the steam will be forced downward as it enters the steamer 2, and when under much pressure will strike against the bottom 5 of the steamer and then ascend through and out of the perforations 2'. It is obvious that in this operation considerable condensation will take place and settle upon the base 5 which is provided with the holes 5' allowing the water to run to the lower point of the steamer from whence it may be discharged through the pipe 4.

1''' is a circumferential collar on the inside of the shell and below the middle thereof and is for the purpose of throwing the wheat back against the steamer after having been thrown from it by the collar 2' previously mentioned. It will be observed that thus the passage of the wheat through the shell is somewhat retarded and its course changed, causing a thorough mixing of the steam among the wheat as it passes through the shell. A valve may be arranged on the pipe 3 on each side of the shell for the purpose of regulating the supply of steam.

Having thus described my invention, what I claim as new, and desire to secure by Letters Patent, is—

In a wheat steamer the combination with a shell in the feed pipe having a conical top and bottom, the base of the cones abutting, and the apex of the cones connected to the feed pipe, of an inner conical shell of the same shape as the outer shell but smaller, and thereby forming a channel between it and the outer shell, the inner shell supported on a steam pipe passing transversely through both shells, small perforations through the walls of the inner shell, except near its lower end, to allow the passage of steam therefrom into the channel, a collar, 2", on the upper half of the inner shell, an inner projection 1''' on the lower half of the outer shell, the steam pipe passing transversely through both shells at about their middle and supporting the inner shell, and having within the inner shell and on the under side of the pipe, perforations 3' whereby the steam will be directed downward and distributed throughout the inner cone, a drip basin in the lower end of the inner shell and a drip pipe conveying the drippings from the steamer, as and for the purpose set forth.

In testimony whereof I affix my signature in presence of two witnesses.

FRANKLIN M. CAINE.

Witnesses:
A. H. SWARTHOUT,
FANNIE ROBBINS.